United States Patent

Suzuki et al.

(10) Patent No.: US 10,326,677 B2
(45) Date of Patent: Jun. 18, 2019

(54) COMMUNICATION DEVICE, AVAILABLE BAND CALCULATION SYSTEM, AVAILABLE BAND CALCULATION METHOD, AND PROGRAM

(71) Applicant: NEC Corporation, Tokyo (JP)

(72) Inventors: Motohiro Suzuki, Tokyo (JP); Kanako Anetai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/557,555

(22) PCT Filed: Feb. 19, 2016

(86) PCT No.: PCT/JP2016/054868
§ 371 (c)(1),
(2) Date: Sep. 12, 2017

(87) PCT Pub. No.: WO2016/147791
PCT Pub. Date: Sep. 22, 2016

(65) Prior Publication Data
US 2018/0062964 A1 Mar. 1, 2018

(30) Foreign Application Priority Data
Mar. 18, 2015 (JP) .................. 2015-054209

(51) Int. Cl.
*H04L 12/26* (2006.01)
*H04L 29/14* (2006.01)

(52) U.S. Cl.
CPC .......... *H04L 43/0882* (2013.01); *H04L 29/14* (2013.01); *H04L 43/0829* (2013.01);
(Continued)

(58) Field of Classification Search
CPC . H04L 43/0882; H04L 43/10; H04L 43/0835; H04L 43/0829; H04L 43/50; H04L 43/0894; H04L 29/14; H04L 43/16
See application file for complete search history.

(56) References Cited

U.S. PATENT DOCUMENTS

| 2008/0253301 A1 | 10/2008 | Keromytis et al. |
| 2010/0157834 A1 | 6/2010 | Keromytis et al. |

(Continued)

FOREIGN PATENT DOCUMENTS

| EP | 2879333 A1 | 6/2015 |
| JP | 2010-213065 A | 9/2010 |
| JP | 2011-142622 A | 7/2011 |
| JP | 2015-029217 A | 2/2015 |
| TW | 201134146 A | 10/2011 |
| WO | WO-2014/017140 A1 | 1/2014 |

OTHER PUBLICATIONS

International Search Report corresponding to PCT/JP2016/054868, 4 pages, dated May 17, 2016.

(Continued)

*Primary Examiner* — Phuc H Tran
(74) *Attorney, Agent, or Firm* — Wilmer Cutler Pickering Hale and Dorr LLP

(57) ABSTRACT

A communication device includes: a receiver unit that receives a plurality of measurement packets among a plurality of measurement packets that respectively have consecutive numbers and are scheduled to be received; an extraction unit that extracts a valid packet group including a plurality of measurement packets having consecutive numbers from among the plurality of received measurement packets; and a calculation unit that calculates an available bandwidth using the extracted valid packet group.

11 Claims, 7 Drawing Sheets

(52) U.S. Cl.
CPC ...... *H04L 43/0835* (2013.01); *H04L 43/0894* (2013.01); *H04L 43/10* (2013.01); *H04L 43/50* (2013.01); *H04L 43/16* (2013.01)

(56) References Cited

U.S. PATENT DOCUMENTS

| | | | | |
|---|---|---|---|---|
| 2012/0051249 A1* | 3/2012 | Nakamura | .......... | H04L 43/0888 370/252 |
| 2013/0058235 A1* | 3/2013 | Johnsson | ................ | H04L 43/50 370/252 |
| 2014/0119214 A1 | 5/2014 | Jeon et al. | | |
| 2015/0180757 A1 | 6/2015 | Oshiba | | |
| 2016/0254972 A1* | 9/2016 | Oshiba | ................... | H04L 47/00 370/252 |

OTHER PUBLICATIONS

Extended European Search Report issued by the European Patent Office for European Application No. 16764621.5 dated Jan. 26, 2018 (9 pages).

Zhang, E. and Xu, L., "Network Path Capacity Comparison without Accurate Packet Time Information," 2014 IEEE 22nd International Conference on Network Protocols, IEEE, pp. 119-130, XP032702441 (Oct. 21, 2014).

Taiwanese Office Action issued by the Taiwan Patent Office for the Taiwanese Patent Application No. 105105348 dated Aug. 17, 2018 (7 pages).

* cited by examiner

| PACKET GROUP NUMBER | START PACKET NUMBER | END PACKET NUMBER | NUMBER OF PACKETS | NUMBER OF LOST PACKETS | LOST STARTING PACKET NUMBER |
|---|---|---|---|---|---|
| 1 | 1 | 4 | 4 | 1 | 4 |
| 2 | 5 | 9 | 5 | 1 | 9 |
| 3 | | | | | |
| N | | | | | | ns
COMMUNICATION DEVICE, AVAILABLE BAND CALCULATION SYSTEM, AVAILABLE BAND CALCULATION METHOD, AND PROGRAM

CROSS-REFERENCE TO RELATED APPLICATIONS

This application is a national stage application of International Application No. PCT/JP2016/054868 entitled "COMMUNICATION DEVICE, AVAILABLE BAND CALCULATION SYSTEM, AVAILABLE BAND CALCULATION METHOD, AND PROGRAM," filed on Feb. 19, 2016, which claims the benefit of the priority of Japanese Patent Application No. 2015-054209 filed on Mar. 18, 2015, the disclosures of each of which are hereby incorporated by reference in their entirety.

TECHNICAL FIELD

The present invention relates to a communication device, an available bandwidth calculation system, an available bandwidth calculation method, and a program.

BACKGROUND ART

In recent years, services using networks have become widespread. There is a growing demand for checking network quality status, and improving network facilities so that service users can comfortably use services. Therefore, as a technique for checking network quality status, there is a technique for estimating an available bandwidth at an IP (Internet Protocol) level by using a packet train composed of a series of measurement packets (Patent Document 1). In the technique of Patent Document 1, a plurality of measurement packets that monotonically increases or decreases, are sequentially transmitted from a transmission device at predetermined transmission intervals. Then, an available bandwidth is estimated in a receiving device, based on changes in reception intervals.

PRIOR ART DOCUMENTS

[Patent Document]
  [Patent Document 1] Japanese Unexamined Patent Application, First Publication No. 2011-142622

SUMMARY OF INVENTION

Problem to be Solved by the Invention

However, with the technique of Patent Document 1, there is a possibility that the level of estimation accuracy may degrade in a case such as a low bandwidth region, where a packet loss occurs due to a buffer overflow of a network device. Here, the network device is a device that relays communication packets transmitted and/or received between a transmission device and a receiving device. This is due to, in the technique of Patent Document 1, measurement packets being transmitted and received in the following manner in order to accurately control the transmission and reception intervals of measurement packets. That is to say, in the technique of Patent Document 1, for example, more than 100 measurement packets are transmitted and received using a protocol (UDP (User Datagram Protocol)/IP) that offers no arrival guarantee. For example, in a low bandwidth region, when a packet storage region (an input buffer) provided in the network apparatus is used up and a buffer overflow occurs, measurement packets are not transmitted to the receiving device and are discarded as a result. On the other hand, when the network device transmits the measurement packets stored in the packet storage area, a space is created in the packet storage area. As a result, the network device becomes able to store the next measurement packet into the packet storage area. Accordingly, the reception interval of the measurement packets when a buffer overflow occurs does not include the transmission time of the discarded packets, and therefore, it becomes shorter than the reception interval of the measurement packets when the buffer overflow does not occur. As a result, in the packet train that has lost measurement packets, changes in the transmission and reception interval of the measurement packets cannot be accurately grasped, and the level of accuracy in estimating an available bandwidth deteriorates.

An exemplary object of the present invention is to provide a communication device, an available bandwidth calculation system, an available bandwidth calculation method, and a program that solve the problem mentioned above.

Means for Solving the Problem

A communication device according to an exemplary aspect of the present invention includes: a receiver unit that receives a plurality of measurement packets among a plurality of measurement packets that respectively have consecutive numbers and are scheduled to be received; an extraction unit that extracts a valid packet group including a plurality of measurement packets having consecutive numbers from among the plurality of received measurement packets; and a calculation unit that calculates an available bandwidth using the extracted valid packet group.

An available bandwidth calculation system according to an exemplary aspect of the present invention includes a transmission device and a receiving device. The transmission device includes: a generating unit that generates a plurality of measurement packets respectively having consecutive numbers; and a transmission unit that transmits the plurality of generated measurement packets. The receiving device includes: a receiver unit that receives a plurality of measurement packets among the plurality of transmitted measurement packets; an extraction unit that extracts a valid packet group including a plurality of measurement packets having consecutive numbers from among the plurality of received measurement packets; and a calculation unit that calculates an available bandwidth using the extracted valid packet group.

An available bandwidth calculation method according to an exemplary aspect of the present invention includes: receiving a plurality of measurement packets among a plurality of measurement packets that respectively have consecutive numbers and are scheduled to be received; extracting a valid packet group including a plurality of measurement packets having consecutive numbers from among the plurality of received measurement packets; and calculating an available bandwidth using the extracted valid packet group.

A program according to an exemplary aspect of the present invention causes a computer to execute: receiving a plurality of measurement packets among a plurality of measurement packets that respectively have consecutive numbers and are scheduled to be received; extracting a valid packet group including a plurality of measurement packets having consecutive numbers from among the plurality of received measurement packets; and calculating an available bandwidth using the extracted valid packet group.

Effect of the Invention

According to at least one exemplary aspect mentioned above, degradation of estimation accuracy can be prevented even in an environment where measurement packets are discarded in a network device that is interposed between the transmission device and the receiving device.

BRIEF DESCRIPTION OF THE DRAWINGS

FIG. 4 is an explanatory diagram for describing an example of packet group information created by a packet group information generation function unit shown in FIG. 2.

EMBODIMENTS FOR CARRYING OUT THE INVENTION

Hereinafter, exemplary embodiments of the present invention will be described with reference to the drawings.

First Exemplary Embodiment

Figure 1:
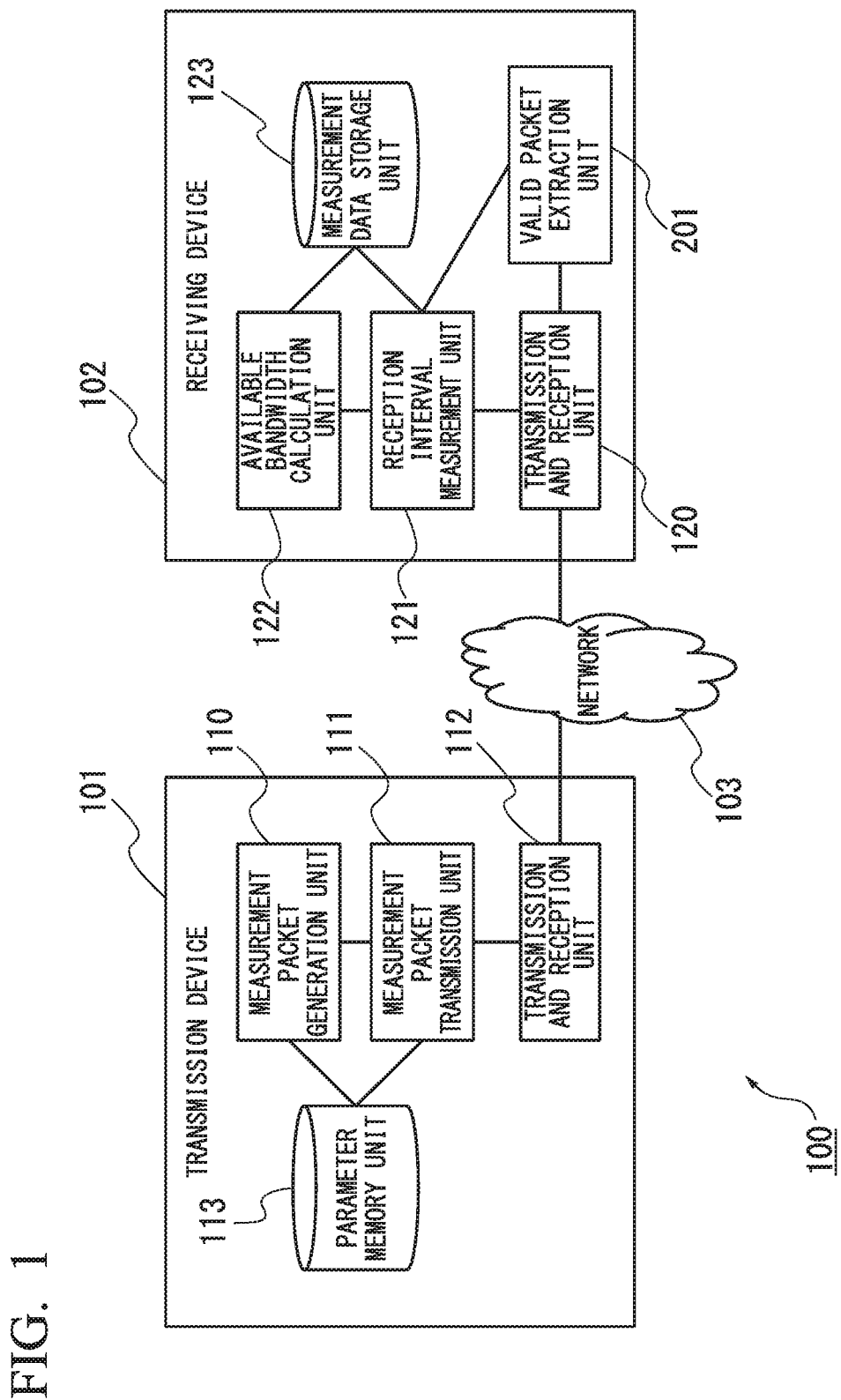
FIG. 1 is a configuration diagram for describing an available bandwidth calculation system according to a first exemplary embodiment of the present invention.

FIG. 1 is a configuration diagram showing a schematic configuration of an available bandwidth calculation system 100 according to a first exemplary embodiment of the present invention. The available bandwidth calculation system 100 includes a transmission device (a transmission side device) 101 and a receiving device (a receiving side device) 102. The transmission device 101 and the receiving device 102 are connected via a network 103.

The transmission device 101 and the receiving device 102 may be an information processing device having a communication function such as a personal computer (PC), a portable information terminal, a mobile phone, and a smartphone, or a communication terminal built in or attached externally as a peripheral device of an information processing device. The transmission device 101 and the receiving device 102 are examples of a communication device. The transmission device 101 and the receiving device 102 internally include a processor such as a CPU (Central Processing Unit) and hardware such as a primary storage device, an auxiliary storage device, and an input device.

The transmission device 101 shown in FIG. 1 includes a measurement packet generation unit 110, a measurement packet transmission unit 111, a transmission and reception unit 112, and a parameter memory unit 113. The receiving device 102 includes a transmission and reception unit 120, a reception interval measurement unit 121, an available bandwidth calculation unit 122, a measurement data storage unit 123, and a valid packet extraction unit 201. The measurement packet generation unit 110 may be referred to simply as the generation unit 110. The measurement packet transmission unit 111 may be referred to simply as the transmission unit 111. The reception interval measurement unit 121 may be referred to simply as the measurement unit 121. The available bandwidth calculation unit 122 may be referred to simply as the calculation unit 122. The valid packet extraction unit 201 may be referred to simply as the extraction unit 201. The transmission device 101 and the receiving device 102 realize the functions of the respective units shown in FIG. 1, by using the processor and other hardware mentioned above and thereby executing a predetermined program.

The generation unit 110 of the transmission device 101 generates a plurality of measurement packets to be transmitted to the receiving device 102. The measurement packets generated by the generation unit 110 are transmitted as a packet train to the receiving device 102. The generation unit 110 generates measurement packets, the packet size of which sequentially increases or decreases from the first packet to the last packet of the packet train. The transmission and reception unit 112 transmits communication signals such as measurement packets to the network 103, and receives from the network 103, communication signals such as communication packets transmitted from the reception device 102. The transmission unit 111, at predetermined transmission intervals, transmits, via the transmission and reception unit 112, a plurality of measurement packets, the packet size of which sequentially increases or decreases.

The parameter memory unit 113 stores the minimum packet size or the maximum packet size, the packet increase size or the packet decrease size, and the measurement packet transmission interval. The generation unit 110 may make reference to the parameter memory unit 113, and may generate measurement packets, the packet size of which is each increased by the packet increase size from the minimum packet size. As another method, the generation unit 110 may make reference to the parameter memory unit 113, and may generate measurement packets, the packet size of which is each decreased by the packet decrease size from the maximum packet size. The transmission unit 111 sequentially transmits measurement packets having different packet sizes at the transmission intervals stored in the parameter memory unit 113.

The transmission and reception unit 120 of the receiving device 102 receives a plurality of measurement packets transmitted by the transmission device 101, the packet size of which sequentially increases or decreases, via one or more network devices (not shown in the figure) that are installed in the network 103. The measurement unit 121 stores information related to the received measurement packet (referred to as measurement data) in the measurement data storage unit 123.

The measurement data stored in the measurement data storage unit 123 includes the packet number (number), packet size, transmission interval, and reception interval of each measurement packet received by the transmission and reception unit 120. When the transmission and reception unit 120 receives the measurement packet, the measurement unit 121 acquires the packet number, the packet size, and the transmission interval included in the received measurement packet. The measurement unit 121 stores, in the measurement data storage unit 123, the packet number, the packet size, and the transmission interval together with the reception time. In addition, the measurement unit 121 finds the reception interval of the measurement packet from the difference between the previous measurement packet reception time and the current measurement packet reception time, and stores the found reception interval in the measurement data storage unit 123. At this time, the measurement unit 121 performs a calculation process of finding the reception interval, while limiting the process target to the measurement packets included in the valid packet group extracted by the extraction unit 201. The extraction unit 201 extracts a valid packet group including consecutive measurement packets successfully received, from among the plurality of received measurement packets. Here, the packet group means a cluster of packets composed of a plurality of packets. Also, the valid packet group is a packet group including measurement packets that are valid for the process of estimating an available bandwidth. The extraction unit 201 notifies the measurement unit 121 and the calculation unit 122 of information indicating the position or the range of the measurement packet that is valid for the available bandwidth estimation process. Details of this extraction unit 201 will be described later.

Figure 9A:
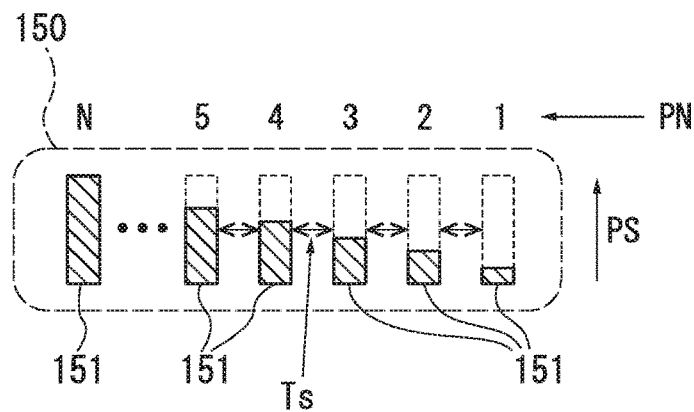
FIG. 9A is an explanatory diagram for describing an example of a packet train in the first exemplary embodiment of the present invention.
Figure 9B:
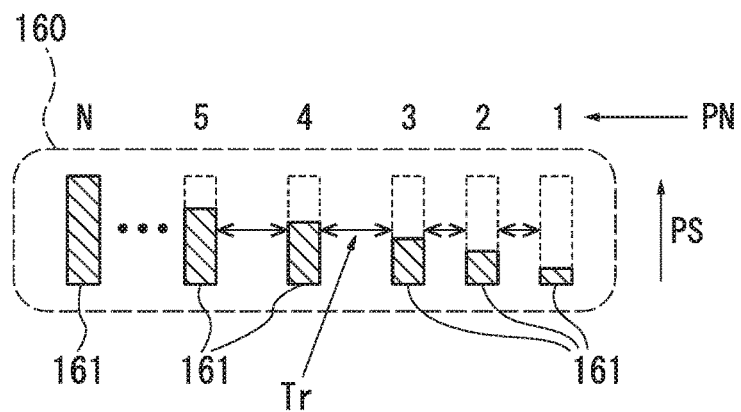
FIG. 9B is an explanatory diagram for describing an example of a packet train in the first exemplary embodiment of the present invention.

FIG. 9A is a diagram showing a transmission time packet train 150. FIG. 9B is a diagram showing a reception time packet train 160. The transmission time packet train 150 is a measurement packet train transmitted by the transmission device 101. The transmission time packet train 150 is composed of a plurality of measurement packets 151, the packet size PS of which sequentially increases. In the following description there will be mainly described a case where the packet train is composed of a plurality of measurement packets, the packet size PS of which is sequentially increased. In FIG. 9A and FIG. 9B, the packet size PS is indicated by the size of the shaded portion. Here, the number of measurement packets 151 generated by the generation unit 110 is set to N (N is an integer of 3 or more). The packet number PN is a number for identifying the measurement packet 151. The transmission time packet train 150 is composed of measurement packets 151 having packet numbers PN 1 to N arranged in time series. As the measurement packets 151, for example, IP packets, UDP packets, RTP (Real-time Transport Protocol) packets, or the like may be used.

In the transmission time packet train 150, the transmission interval Ts of each measurement packet 151 is equal to the transmission interval stored in the parameter memory unit 113. That is to say, the time intervals between adjacent measurement packets 151 are equal intervals. The packet size PS of the measurement packet 151 with the packet number 1 is equal to the minimum packet size stored in the parameter storage unit 113. The packet size PS of the measurement packet with the packet number 2 is larger than the size of the measurement packet with the packet number 1 by the packet increment size stored in the parameter storage unit 113. Thereafter, the packet size of the measurement packet 151 increases by the packet increment size every time the packet number increases by one. The generation unit 110 adds, in each measurement packet 151, a packet number PN, a packet size PS, and a transmission interval Ts.

The reception time packet train 160 shown in FIG. 9B shows the measurement packet train received by the receiving device 102. The transmission time packet train 150 is transmitted through the network 103 and received by the receiving device 102 as a reception time packet train 160. In the reception time packet train 160, until a certain point in time, the reception interval Tr of the measurement packet 161 is substantially equal to the transmission interval Ts at the time of transmission of the measurement packet. However, as the packet size PS of the measurement packet 161 increases, at a certain point in time, the reception interval Tr of the measurement packet 161 becomes greater than the transmission interval Ts at the time of transmission.

When the reception interval Tr of the measurement packet 161 becomes greater than the transmission interval Ts, the calculation unit 122 calculates the available bandwidth using the immediately preceding measurement packet of the measurement packet. The reception interval Tr of the measurement packet 161 is found by the measurement unit 121 using the valid packet group extracted by the extraction unit 201.

Since the packet size of the measurement packets increases, the measurement packet transmitted immediately before the measurement packet, the reception interval of which is greater than the transmission interval, corresponds to the measurement packet with the largest packet size among the measurement packets having substantially equal reception intervals and transmission intervals. The calculation unit 122 calculates the available bandwidth in the following procedure, based on the packet size and the transmission interval of the measurement packet transmitted immediately before the measurement packet, the reception interval of which is greater than the transmission interval.

That is to say, the calculation unit 122 first checks the packet number of the measurement packet 161 whose reception interval Tr is greater than the transmission interval Ts. Let j be the packet number of the measurement packet 161 when the reception interval Tr is greater than the transmission interval Ts. In this case, the reception interval between the measurement packet 161 of the packet number j and the measurement packet 161 of the packet number j−1 is greater than the transmission interval between the measurement packet 161 of the packet number j and the measurement packet 161 of the packet number j−1. Furthermore, the reception interval between the measurement packet 161 of the packet number j−1 and the measurement packet 161 of the packet number j−2 is substantially equal to the transmission interval between the measurement packet 161 of the packet number j−1 and the measurement packet 161 of the packet number j−2. Here, the measurement packets 161 of the packet number j−2, j−1, and j are measurement packets that are included in the valid packet group.

Next, the calculation unit 122 acquires, from the measurement data storage unit 123, the packet size and the transmission interval Ts of the measurement packet 161 with the packet number j−1 (the transmission interval between the measurement packet 161 with the packet number j−1 and the measurement packet 161 with the packet number j−2). After that, the calculation unit 122 calculates the available bandwidth using the calculation formula of "available bandwidth=(packet size of the (j−1) th measurement packet)/transmission interval Ts". The calculation unit 122 stores the calculated available bandwidth in the measurement data storage unit 123. In addition, the calculation unit 122 transmits the calculated available bandwidth to the transmission device 101 via the transmission and reception unit 120. The transmission and reception unit 112 of the transmission device 101 receives the measurement result of the available bandwidth transmitted by the receiving device 102.

Figure 2:
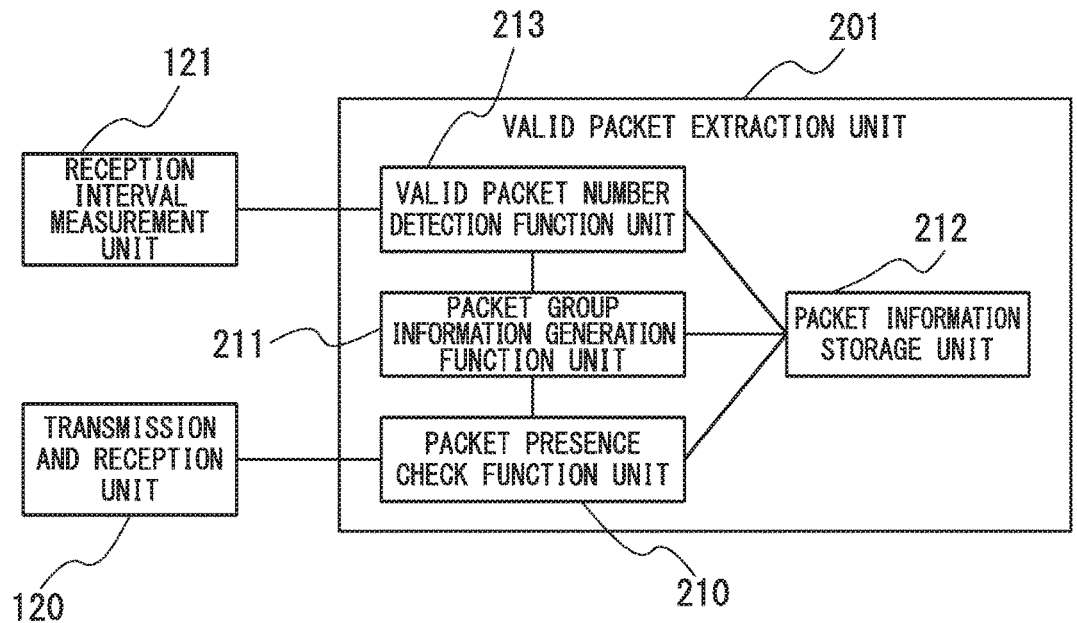
FIG. 2 is a configuration diagram of a valid packet extraction unit shown in FIG. 1.

Next, details of the extraction unit 201 shown in FIG. 1 are described with reference to FIG. 2 to FIG. 5. FIG. 2 is a block diagram showing a configuration example of the extraction unit 201. In the configuration shown in FIG. 2, the same components as those shown in FIG. 1 are denoted by the same reference symbols, and the descriptions thereof are omitted.

In the configuration example shown in FIG. 2, the extraction unit 201 includes a packet presence check function unit 210, a packet group information generation function unit 211, a packet information storage unit 212, and a valid packet number detection function unit 213. The packet presence check function unit 210 may be referred to simply as the check function unit 210 in some cases. The packet group information generation function unit 211 may be referred to simply as the generation function unit 211 in some cases. The packet information storage unit 212 may be referred to simply as the storage unit 212 in some cases. The valid packet number detection function unit 213 may be referred to simply as the detection function unit 213 in some cases. The check function unit 210 checks whether or not each measurement packet included in the packet train has arrived. The generation function unit 211 divides the received packet train into packet groups where the measurement packet lost in the network is treated as a separator, and generates information of each packet group (each packet group). The storage unit 212 stores information indicating the arrival result of each measurement packet generated by the check function unit 210, and information related to each packet group generated by the generation function unit 211. The detection function unit 213 detects, from the information stored in the storage unit 212, the number of the measurement packet used by the measurement unit 121 and the calculation unit 122 in the process for estimating the available bandwidth.

Figure 3:
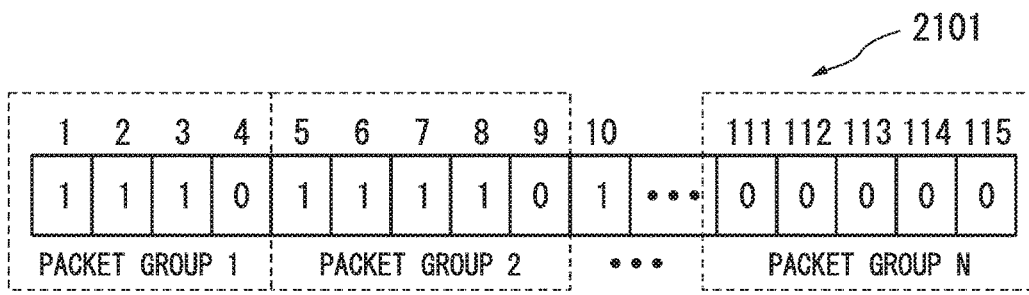
FIG. 3 is an explanatory diagram for describing an example of packet arrival information created by a packet presence check function unit shown in FIG. 2.

Next, with reference to FIG. 3, information indicating whether or not a measurement packet has arrived (referred to as packet arrival information 2101), generated by the check function unit 210, will be described. FIG. 3 shows a configuration example of the packet arrival information 2101. In the example shown in FIG. 3, the packet arrival information 2101 has an array structure in which each arrival result of all measurement packets scheduled to arrive (scheduled to be received) serves as an element. The packet arrival information 2101 is such that the leading element indicates the arrival result of the measurement packet scheduled to arrive first. The packet arrival information 2101 includes elements ranging sequentially from the element that indicates the measurement packet scheduled to arrive second to the element that indicates the measurement packet scheduled to arrive at the 115th. In each element, "1" is stored when a packet arrives, and "0" when a packet does not arrive.

Next, with reference to FIG. 4, information of the packet group (referred to as packet group information), generated by the generation function unit 211, will be described. FIG. 4 shows a configuration example of packet arrival information 2111. The contents of the packet group information 2111 shown in FIG. 4 correspond to the contents of the packet arrival information 2101 shown in FIG. 3. In the example shown in FIG. 4, the packet group information 2111 is configured as a table that includes a plurality of records. Each record includes a plurality of fields for storing a packet group number, a start packet number, an end packet number, a number of packets, a number of lost packets, and a lost starting packet number.

The packet group number is a number for identifying each packet group that is divided when a received packet train is divided into a plurality of packet groups where the measurement packet lost in the network is treated as a separator. The start packet number is the number of the measurement packet with which the packet group identified by the packet group number of the same record starts. The end packet number is the number of the measurement packet with which the packet group ends. The number of packets represents the number of measurement packets included in the packet group. The number of lost packets represents the number of measurement packets marked as "0" in the packet arrival information 2101. The lost starting packet number is the number of the first measurement packet marked as "0" in the packet arrival information 2101 in the packet group. As a method of separating the packet group, for example, it can be realized by treating a position marked as "1" immediately after "0" as a separation point in the packet arrival information 2101. For example, in packet arrival information 2101 shown in FIG. 3, packet number 4 and packet number 9 are separation points. Moreover, measurement packets of packet numbers 1 to 4 are regarded as a packet group 1, and measurement packets of packet numbers 5 to 9 are regarded as a packet group 2. In this case, for the packet group 1, the packet group number is 1, the start packet number is 1, the end packet number is 4, the number of packets is 4, the number of lost packets is 1, and the number of lost starting packet is 4. Also, for the packet group 2, the packet group number is 2, the start packet number is 5, the end packet number is 9, the number of packets is 5, the number of lost packets is 1, and the number of the lost starting packet is 9.

Figure 5:
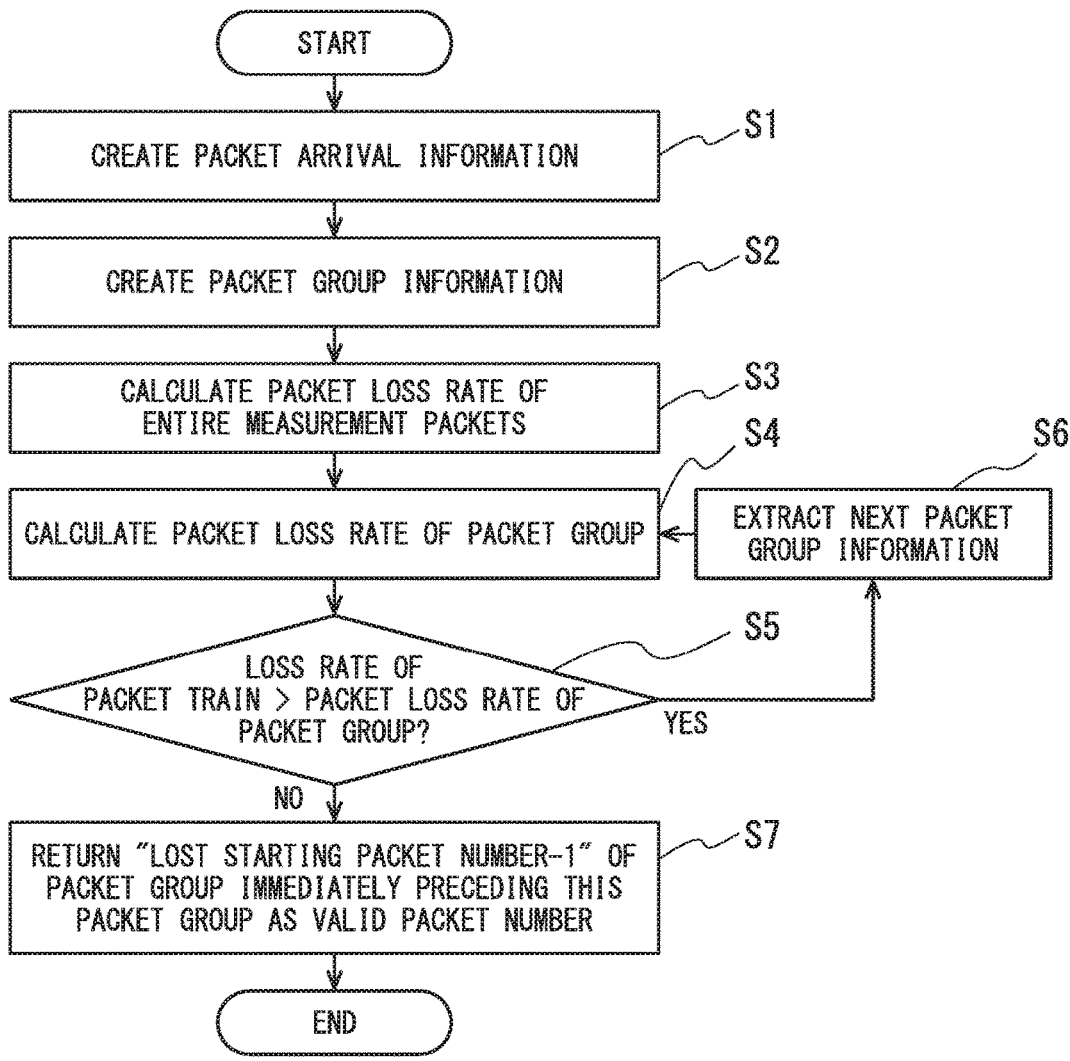
FIG. 5 is a flowchart showing an operation of the valid packet extraction unit shown in FIG. 2.

Next, an operation of the extraction unit 201 shown in FIG. 2 is described with reference to the flowchart shown in FIG. 5.

First, the transmission and reception unit 120 of the receiving device 102 receives a packet train. Based on the received packet train, the check function unit 210 creates packet arrival information 2101 (Step S1). For example, this processing can be realized by means of a process such as the one shown in FIG. 3. That is to say, the check function unit 210 creates an array that stores information indicating whether or not each measurement packet has arrived. Furthermore, the check function unit 210 inserts "1" if a measurement packet arrives at each element constituting the array, and inserts "0" if the measurement packet has not arrived.

Next, the generation function unit 211 generates packet group information (Step S2). In this process, for example, the generation function unit 211 can generate the packet group information 2111 shown in FIG. 4 in a manner described below. First, the generation function unit 211 determines a position in the packet arrival information 2101 where "0" and "1" are consecutively stored in this order, as being a separator of the packet group. Next, the generation function unit 211 sets the packet number for which the "0" is stored, as the end packet number of the "previous" packet group, and sets the packet number for which the following "1" is stored, as the start packet number of the "following" packet group. Then, the generation function unit 211 calculates the number of packets using a calculation formula "end packet number−start packet number+1". Next, the generation function unit 211 sets the number of measurement packets for which "0" is stored in the packet arrival information 2101, as the number of lost packets. Next, the generation function unit 211 inserts the number of the measurement packet in which the first "0" is stored in the packet arrival information 2101, into "lost starting packet number". In this process, the generation function unit 211 can generate the packet group information 2111.

Next, the detection function unit 213 calculates a packet loss rate in the packet train (Step S3). That is to say, the detection function unit 213 calculates a packet loss rate for all measurement packets included in the received packet train. In this process, for example, the detection function unit 213 calculates the number of "1 s" and "0s" from the packet arrival information 2101 stored in the storage unit 212, and calculates the packet loss rate using a calculation formula "number of 0s/(number of 0s+number of 1s)" to calculate the packet loss rate.

Next, the detection function unit 213 calculates the packet loss rate of each packet group (Step S4). In this process, for example, the detection function unit 213 extracts, from the packet group information 2111 stored in the storage unit 212, the number of lost packets and the number of packets in one packet group. Then, the detection function unit 213 calculates the packet loss rate of the packet group by means of a calculation formula "number of lost packets/number of packets".

Next, the detection function unit 213 compares the packet loss rate of the packet train calculated in Step S3 with the packet loss rate of the packet group calculated in Step S4 (Step S5). Here is described a case where the detection function unit 213 determines that "packet loss rate of packet train>packet loss rate of packet group" as a result of Step S5. In this case, the detection function unit 213 extracts information on the next packet group (a packet group of a packet number greater by one) from the storage unit 212, and repeats the process from Step S4.

Here is described a case, on the other hand, where the detection function unit 213 determines that "packet loss rate of packet train<packet loss rate of packet group" as a result of Step S3. In this case, the detection function unit 213 notifies the measurement unit 121 of that measurement packets having the numbers up to "lost starting packet number−1" in a packet group immediately preceding the packet group (a packet group having a packet number that is smaller by one) are valid for the available bandwidth estimation process (Step S7). In this case, the packet group including the measurement packets having the numbers from the leading measurement packet to "lost starting packet number−1", is a valid packet group. An alternative method may be such that the packet group including the measurement packet having the number "lost starting packet number−1" is treated as a valid packet group.

Taking a case where the packet size sequentially increases as an example, here is described the reason, in the above operation, why it is possible, by comparing the packet loss rate of the packet train (that is, the packet loss rate of the entire measurement packets) with the packet loss rate of the packet group, to identify a position where measurement packets begin to be discarded. In the case where the network device discards measurement packets due to a buffer overflow in a situation where the packet size increases sequentially, once packet discard starts, packets are continuously discarded until the packet stored in the packet storage region has been transmitted. When packet loss occurs in a packet group, packet size becomes greater in subsequent packet groups, and consequently, packets are less likely to be transmitted. As a result, more packets are discarded in subsequent packet groups. In this type of situation where packet loss continuously occurs once packet loss has occurred, the loss rate for each packet group significantly changes before and after the packet loss caused by the buffer overflow. In many cases, this type of change in the loss rate leads to a situation such as the one described below. That is to say, the packet loss rate of the packet group before occurrence of the packet loss caused by the buffer overflow is sufficiently smaller than the packet loss rate of the packet train. This is because the probability of occurrence of incidental packet loss (such as packet loss caused by physical interference at the time of packet transfer) is sufficiently smaller than the packet loss rate of the entire packet train including the packet loss due to the buffer overflow. On the other hand, after the buffer overflow has occurred, the packet loss rate of the packet group becomes greater than the packet loss rate of the packet train. This is because the entire packet train includes the packet group before the occurrence of the buffer overflow. Therefore, by comparing the packet loss rate of the packet train with the packet loss rate of the packet group, it is possible to identify the position where the buffer overflow has started to occur. Further, it is possible to appropriately set a reference value according to the changing communication environment, by setting the reference of comparison as the packet loss rate of the packet train, that is, by dynamically setting the reference.

As described above, according to the first exemplary embodiment, there is an effect that degradation in the estimation accuracy can be prevented even in an environment where a packet loss occurs in the network device due to a buffer overflow. The reason for this is that in the packet train transmitted by the transmission device 101, measurement packets up until a packet loss has occurred in the network device due to a buffer overflow are extracted, and the estimation process is performed using the measurement packets.

In the above description there has been described the case where the packet size of the measurement packets is sequentially increased. The case where the packet size is sequentially decreased can be dealt with by changing the configuration as follows. The configurations of the transmission device and the receiving device in the case of sequentially decreasing the packet size are the same as those of the transmission device 101 and the receiving device 102 shown in FIG. 1.

However, the operation of the generation unit 110 is different. In the case of sequentially decreasing the packet size, the maximum packet size and the packet decrease size are stored in the parameter memory unit 113. Then, the generation unit 110 generates measurement packets, the packet size of which decreases by the packet decrease size from the maximum packet size. This point is different from the case where the packet size is sequentially increased.

Further, the packet train transmitted by the transmission device 101 corresponds to a configuration in which the arrangement order of the measurement packets 151 in the transmission time packet train 150 shown in FIG. 9A is reversed. That is to say, the packet size of the measurement packet with the packet number 1 is the greatest. Each time the packet number increases by one, the size of the measurement packet decreases by the packet decrease size. The packet size of the measurement packet with the packet number N is the smallest. Here is described a case where a packet train configured with this type of measurement packets is used as a transmission time packet train. In this case, in the reception time packet train received by the receiving device 102, the reception interval of the measurement packet is greater than the transmission interval at the time of measurement packet transmission until a certain point in time, and the reception interval becomes substantially equal to the transmission interval at and after a certain point in time. When the reception interval of the measurement packet becomes substantially equal to the transmission interval, the calculation unit 122 calculates the available bandwidth, based on the packet size and the transmission interval of the measurement packet at the time. That is to say, the calculation unit 122 calculates the available bandwidth, based on the packet size and the transmission interval of the first measurement packet of which the reception interval becomes substantially equal to the transmission interval.

Second Exemplary Embodiment

Figure 6:
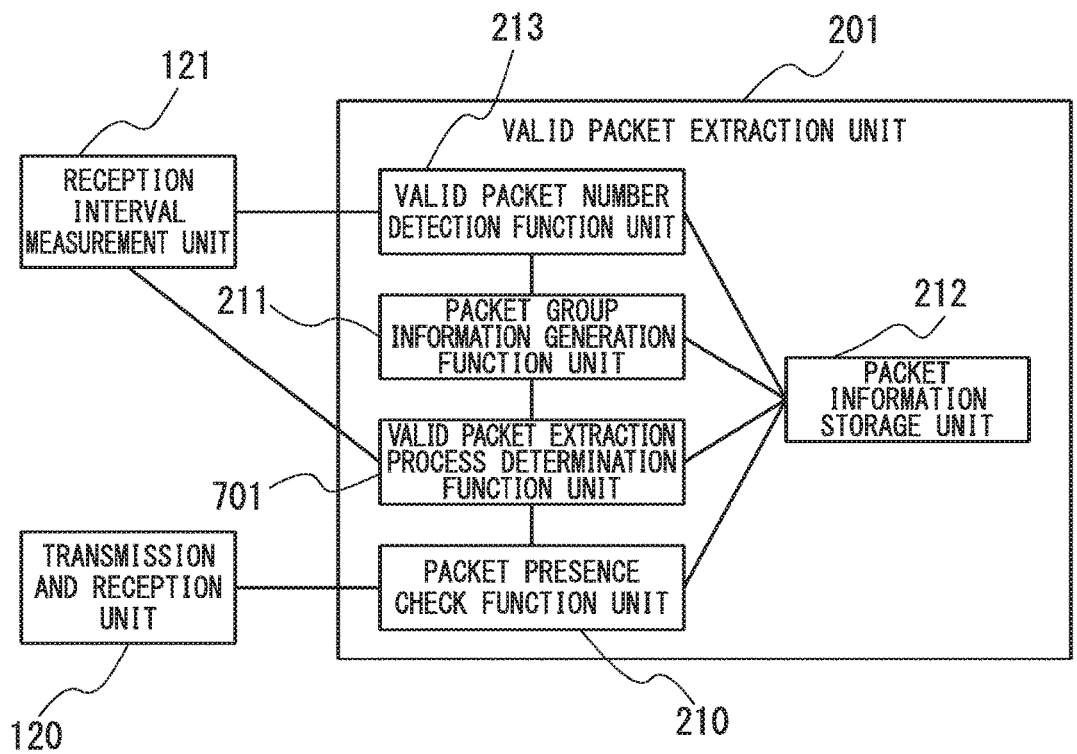
FIG. 6 is a configuration diagram of a valid packet extraction unit according to a second exemplary embodiment of the present invention.

FIG. 6 is a configuration diagram showing a configuration of an extraction unit 201 according to a second exemplary embodiment.

The configuration of the available bandwidth calculation system 100 shown in FIG. 1 is the same between the first exemplary embodiment and the second exemplary embodiment. The configuration of the extraction unit 201 is different between the first exemplary embodiment and the second exemplary embodiment. As shown in FIG. 6, in the second exemplary embodiment, a valid packet extraction process determination function unit 701 is added to the extraction unit 201 in the first exemplary embodiment. The valid packet extraction process determination function unit 701 may be referred to simply as the determination function unit 701.

The determination function unit 701 has a function of comparing the packet loss rate in the packet train with a preliminarily specified threshold value (for example, 10%), and determining whether to call up the generation function unit 211. The determination function unit 701 performs the following process in the case where no packet loss due to buffer overflow has occurred and only an incidental packet loss has occurred. The determination function unit 701 determines whether or not a packet loss has occurred incidentally by comparing the packet loss rate in the packet train with the preliminarily specified threshold value (for example, 10%). If it is determined that a packet loss has occurred incidentally, the determination function unit 701 instructs the measurement unit 121 to use the packet train received by the transmission and reception unit 120 as it is to find the reception interval for estimating the available bandwidth. That is to say, in a case where only an incidental packet loss has occurred, the determination function unit 701 uses the packet train received by the transmission and reception unit 120 as it is, to cause the measurement unit 121 and the calculation unit 122 to perform the available bandwidth estimation process.

Figure 7:
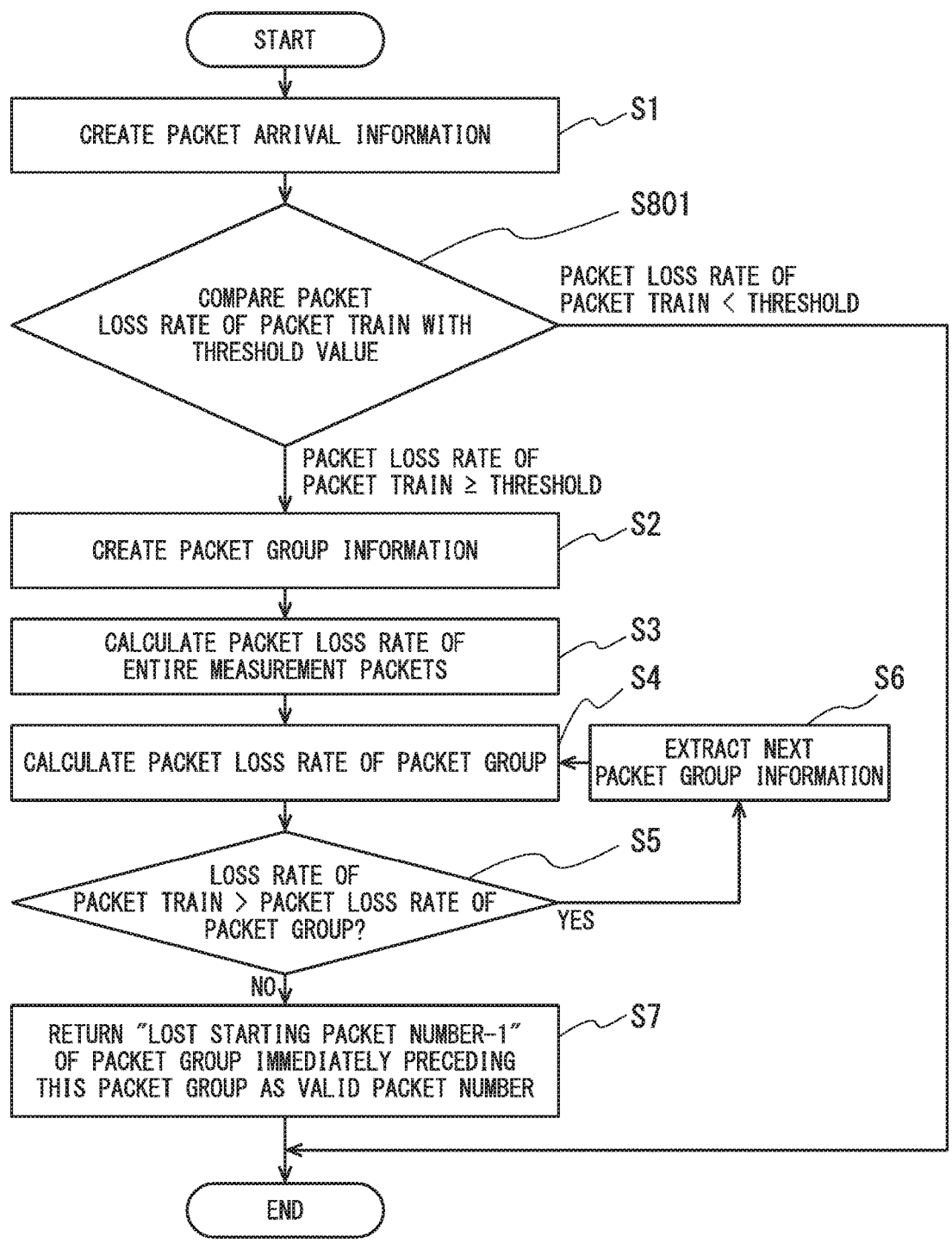
FIG. 7 is a flowchart showing an operation of the valid packet extraction unit shown in FIG. 6.

Next, an operation of the second exemplary embodiment is described with reference to FIG. 7. The flowchart shown in FIG. 7 is a flowchart in which Step S801 is added to the flowchart of the first exemplary embodiment shown in FIG. 5. In this Step S801, after the determination function unit 701 has calculated the packet loss rate of the packet train from the packet arrival information 2101 created by the check function unit 210 in Step S1, the determination function unit 701 compares the calculated packet loss rate with the preliminarily specified threshold value. This threshold value indicates the probability of incidental packet loss occurrence, for example, 10%, which is a value lower than the packet loss rate in the packet train where a packet loss due to buffer overflow has occurred.

As a result of Step S801, if the "packet loss rate of packet train" is smaller than the "threshold value", it is presumed that the packet loss has occurred incidentally, and therefore, the determination function unit 701 ends the process.

On the other hand, as a result of Step S801, if the "packet loss rate of packet train" is greater than or equal to the "threshold value", it is estimated that a packet loss due to buffer overflow is included, and therefore, the determination function unit 701 performs the process of Step S2.

In the second exemplary embodiment, if the packet loss rate of a plurality of measurement packets (that is, the packet loss rate of the packet train) is less than the predetermined threshold value, the calculation unit 122 can calculate the available bandwidth as follows. That is to say, the calculation unit 122 can calculate the available bandwidth by using the measurement packet that was successfully received last among the plurality of measurement packets.

This effect of the second exemplary embodiment is that, in addition to the effect of the first exemplary embodiment, even if only an incidental packet loss has occurred, there is achieved an effect of preventing degradation of the estimation accuracy of available bandwidth. The reason for this is as follows. That is to say, in a case where the packet loss rate of the packet train is compared with the threshold value, and the packet loss can be determined as having occurred incidentally, the process will not be performed by the generation function unit 211. By not performing the process by the generation function unit 211, the packet train is prevented from being divided into unintended packet groups. As a result, the measuring unit 121 can use the received packet train as it is.

<<Basic Configuration>>

Figure 8:
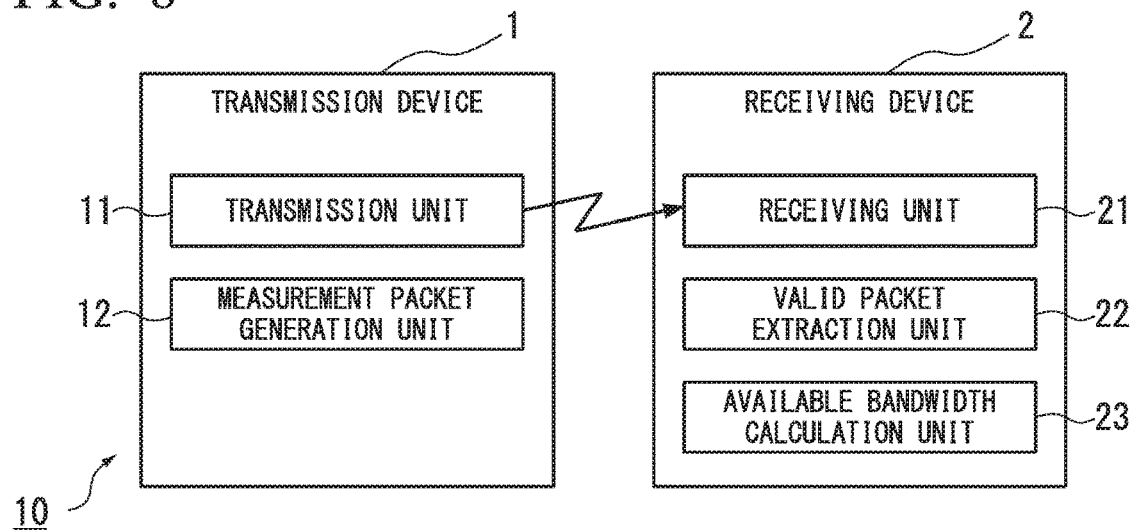
FIG. 8 is a schematic block diagram showing a basic configuration of an available bandwidth calculation system according to an exemplary embodiment of the present invention.

FIG. 8 is a schematic block diagram showing a basic configuration of an available bandwidth calculation system. In the exemplary embodiments described above, the configurations shown in FIG. 2 and FIG. 6 have been described as exemplary embodiments of the available bandwidth calculation system. The basic configuration of the available bandwidth calculation system is as shown in FIG. 8. That is to say, the basic configuration of an available bandwidth calculation system 10 is configured to include a transmission device (transmission side device) 1, and a receiving device (reception side device) 2.

The basic configuration of the receiving device 2 is configured to include a receiver unit 21, a valid packet extraction unit 22, and an available bandwidth calculating unit 23. The receiving unit 21 receives a plurality of measurement packets, the packet size of which sequentially increases or decreases. The valid packet extraction unit 22 extracts a valid packet group including consecutive measurement packets successfully received, from among the plurality of received measurement packets. The available bandwidth calculation unit 23 calculates an available bandwidth using the extracted valid packet group.

The basic configuration of the transmission device 1 is configured to include a transmission unit 11 and a measurement packet generation unit 12. The measurement packet generation unit 12 generates a plurality of measurement packets, the packet size of which sequentially increases or decreases. The transmission unit 11 transmits the measurement packets generated by the measurement packet generation unit 12 to the receiver unit 21.

The transmission device 1 and the receiving device 2 are connected via a network (not shown in the figure).

The available bandwidth calculation system 10 can identify the location where measurement packet discard started in the packet train, and can use the measurement packets that reached the receiving device 2 before the discard started, for the available bandwidth estimation process. As a result, degradation of the estimation accuracy can be prevented even in an environment where measurement packets are discarded in the network device.

The correspondence relationship between the configuration shown in FIG. 8 and the configurations shown in FIG. 1, FIG. 2, and FIG. 6 is as follows. The available bandwidth calculation system 10 in FIG. 8 corresponds to the available bandwidth calculation system 100 in FIG. 1. The transmission device 1 in FIG. 8 corresponds to the transmission device 101 in FIG. 1. The receiving device 2 in FIG. 8 corresponds to the receiving device 102 in FIG. 1. The receiver unit 21 in FIG. 8 corresponds to the transmission and reception unit 120 in FIG. 1. The valid packet extraction unit (extraction unit) 22 in FIG. 8 corresponds to the valid packet extraction unit 201 in FIG. 1. The available bandwidth calculation unit (calculation unit) 23 in FIG. 8 corresponds to the available bandwidth calculation unit 122 in FIG. 1. The transmission unit 11 in FIG. 8 corresponds to the transmission and reception unit 112 in FIG. 1. The measurement packet generation unit (generation unit) 12 in FIG. 8 corresponds to the measurement packet generation unit 110 in FIG. 1.

Moreover, an example of the first measurement packet is the measurement packet scheduled to arrive fourth as described with reference to FIG. 3. An example of the second measurement packet is the measurement packet scheduled to arrive fifth as described with reference to FIG. 3. An example of the third measurement packet is the measurement packet scheduled to arrive ninth as described with reference to FIG. 3. An example of the fourth measurement packet is the measurement packet scheduled to arrive tenth as described with reference to FIG. 3. An example of the fifth measurement packet is the measurement packet scheduled to arrive third as described with reference to FIG. 3. An example of the sixth measurement packet is the measurement packet scheduled to arrive second as described with reference to FIG. 3. An example of the seventh measurement packet is the measurement packet scheduled to arrive eighth as described with reference to FIG. 3. Furthermore, an example of the calculating unit (packet group loss rate calculation unit) is the function of executing the process of Step S4 shown in FIG. 5 and FIG. 7 performed by the valid packet number detection function unit 213. An example of the first threshold value is the "packet train loss rate" described with reference to FIG. 5 (Step S3 and Step S5). Moreover, an example of the second threshold value is the "threshold value" described with reference to FIG. 7 (Step S801).

Exemplary embodiments of the present invention are not limited to those described the above. For example, the respective constituents shown in FIG. 2 and FIG. 6 may be appropriately integrated or divided. In addition, a program executed by a processor provided in each constituent may be distributed partially or wholly via a computer readable recording medium or a communication line.

Examples of scenes to which the exemplary embodiments of the present invention may be applied include the following scenes. That is to say, the exemplary embodiments of the present invention may be incorporated into an application to be distributed to general users, and used as a solution to be utilized for area improvement by periodically analyzing quality information (available bandwidth). Moreover, when a company provides a service, it can be utilized for isolating a cause of degradation of the sensory experience in use of the service, by acquiring communication quality information (available bandwidth) for a network black box section present in the service.

This application is based upon and claims the benefit of priority from Japanese patent application No. 2015-054209, filed Mar. 18, 2015, the disclosure of which is incorporated herein in its entirety by reference.

INDUSTRIAL APPLICABILITY

The present invention may be applied to a communication device, an available bandwidth calculation system, an available bandwidth calculation method, and a program.

REFERENCE SYMBOLS 10, 100 Available bandwidth calculation system
1, 101 Transmission device
2, 102 Receiving device
11 Transmission unit
21 Receiver unit
103 Network
12, 110 Measurement packet generation unit (generation unit)
111 Measurement packet transmission unit (transmission unit)
112 Transmission and reception unit
113 Parameter memory unit
120 Transmission and reception unit
121 Reception interval measurement unit (measurement unit)
23, 122 Available bandwidth calculation unit (calculation unit)
123 Measurement data storage unit
150 Transmission time packet train
160 Reception time packet train
22, 201 Valid packet extraction unit (extraction unit)
210 Packet presence check function unit (check function unit)
211 Packet group information generation function unit (generation function unit)
212 Packet information storage unit (storage unit)
213 Valid packet number detection function unit (detection function unit)
701 Valid packet extraction process determination function unit (determination function unit)

The invention claimed is:
1. A communication device comprising:
a receiver unit that receives a plurality of measurement packets among a plurality of transmitted measurement packets that respectively have consecutive numbers and are transmitted from a transmission device, a size of each of the plurality of transmitted measurement packets increasing as a number of each of the plurality of transmitted measurement packets increases;
an extraction unit that divides the plurality of transmitted measurement packets into a plurality of packet groups where a measurement packet of which the reception failed is treated as a group separator, compares a first packet loss rate of each of the plurality of packet groups and a second packet loss rate of the plurality of transmitted measurement packets, and extracts a packet group immediately preceding a packet group in which the first packet loss rate is greater than or equal to the second packet loss rate as a valid packet group; and
a calculation unit that calculates an available bandwidth using the extracted valid packet group.

2. The communication device according to claim 1,
wherein the plurality of transmitted measurement packets include a first measurement packet, a second measurement packet having a number greater than and consecutive to a number of the first measurement packet, a third measurement packet having a number greater than the number of the second measurement packet, and a fourth measurement packet having a number greater than and consecutive to the number of the third measurement packet,
the plurality of received measurement packets are a plurality of measurement packets that are successfully received among the plurality of transmitted measurement packets,
a plurality of measurement packets other than the plurality of measurement packets that are successfully received among the plurality of transmitted measurement packets, are a plurality of measurement packets of which the reception failed;
the plurality of measurement packets that are successfully received include the second measurement packet and the fourth measurement packet,
the plurality of measurement packets of which the reception failed include the first measurement packet and the third measurement packet,
the extraction unit determines a boundary between the first measurement packet and the second measurement packet as being the group separator, and determines a boundary between the third measurement packet and the fourth measurement packet as being the group separator,
the extraction unit generates, based on the determined group separators, a first packet group including the first measurement packet, and a second packet group including the second measurement packet and the third measurement packet,
the extraction unit calculates the first packet loss rate of the second packet group, and
in a case where the calculated first packet loss rate of the second packet group is greater than or equal to the second packet loss rate, the extraction unit extracts, as the valid packet group, a plurality of measurement packets having numbers smaller than the number of the first measurement packet.

3. The communication device according to claim 2,
wherein the extraction unit calculates the first packet loss rate of the first packet group, and
in a case where the calculated first packet loss rate of the first packet group is less than the second packet loss rate and the calculated first packet loss rate of the second packet group is greater than or equal to the second packet loss rate, the extraction unit extracts, as the valid packet group, the plurality of measurement packets having numbers smaller than the number of the first measurement packet.

4. The communication device according to claim 3,
wherein in a case where the calculated first packet loss rate of the first packet group is less than the second packet loss rate and the calculated first packet loss rate of the second packet group is greater than or equal to the second packet loss rate, the extraction unit extracts, as the valid packet group, only the measurement packets having numbers smaller than the number of the first measurement packet.

5. The communication device according to claim 2,
wherein the first packet group further includes a fifth measurement packet and a sixth measurement packet, the second packet group further includes a seventh measurement packet,
the fifth measurement packet is included in the plurality of measurement packets that are successfully received, and has a number smaller than the number of the first measurement packet,
the sixth measurement packet is included in the plurality of measurement packets that are successfully received, and has a number smaller than and consecutive to the number of the fifth measurement packet, and
the seventh measurement packet is included in the plurality of measurement packets that are successfully received, and has a number smaller than and consecutive to the number of the fourth measurement packet.

6. The communication device according to claim 1, wherein the calculation unit calculates the available bandwidth using the measurement packet lastly received by the receiving unit, among the plurality of measurement packets included in the valid packet group.

7. The communication device according to claim 1,
wherein the extraction unit calculates the second packet loss rate of the plurality of transmitted measurement packets, and
in a case where the second packet loss rate of the plurality of transmitted measurement packets is less than a threshold value, the calculation unit calculates an available bandwidth using the measurement packet lastly received by the receiving unit, among the plurality of measurement packets included in the valid packet group.

8. The communication device according to claim 1,
wherein the extraction unit divides the plurality of transmitted measurement packets into the plurality of packet groups with a boundary between the measurement packet of which reception failed and a measurement packet that is successfully received among the plurality of transmitted measurement packets as the group separator, the number of the measurement packet that is successfully received being consecutive to the measurement packet of which reception failed.

9. The communication device according to claim 1,
wherein the first packet loss rate indicates a ratio of measurement packets of which the reception failed of the packet group to the plurality of measurement packets of the packet group; and
the second packet loss rate indicates a ratio of measurement packets of which the reception failed to the plurality of transmitted measurement packets.

10. An available bandwidth calculation system comprising a transmission device and a receiving device,
wherein the transmission device comprises:
a generating unit that generates a plurality of measurement packets respectively having consecutive numbers, a size of each of the plurality of measurement packets increasing as a number of each of the plurality of measurement packets increases; and
a transmission unit that transmits the plurality of generated measurement packets to the receiving device, and
the receiving device comprises:
a receiver unit that receives a plurality of measurement packets among the plurality of transmitted measurement packets;
an extraction unit that divides the plurality of transmitted measurement packets into a plurality of packet groups where a measurement packet of which the reception failed is treated as a group separator, compares a first packet loss rate of each of the plurality of packet groups and a second packet loss rate of the plurality of transmitted measurement packets, and extracts a packet group immediately preceding a packet group in which the first packet loss rate is greater than or equal to the second packet loss rate as a valid packet group; and a calculation unit that calculates an available bandwidth using the extracted valid packet group.

11. An available bandwidth calculation method comprising, by a communication device:

receiving a plurality of measurement packets among a plurality of transmitted measurement packets that respectively have consecutive numbers and are transmitted from a transmission device, a size of each of the plurality of transmitted measurement packets increasing as a number of each of the plurality of transmitted measurement packets increases;

dividing the plurality of transmitted measurement packets into a plurality of packet groups where a measurement packet of which the reception failed is treated as a group separator;

comparing a first packet loss rate of each of the plurality of packet groups and a second packet loss rate of the plurality of transmitted measurement packets;

extracting a packet group immediately preceding a packet group in which the first packet loss rate is greater than or equal to the second packet loss rate as a valid packet group; and calculating an available bandwidth using the extracted valid packet group.

* * * * *